United States Patent [19]

Steenborg

[11] Patent Number: 5,027,596
[45] Date of Patent: Jul. 2, 1991

[54] HIGH PERFORMANCE PROPULSION THRUSTER, ESPECIALLY FOR ATTITUDE AND ORBIT CONTROL OF A SPACE FLIGHT BODY

[75] Inventor: Manfred Steenborg, Ritterhude-Ihlpohl, Fed. Rep. of Germany

[73] Assignee: ERNO Raumfahrttechnik GmbH, Bremen, Fed. Rep. of Germany

[21] Appl. No.: 376,765

[22] Filed: Jul. 7, 1989

[30] Foreign Application Priority Data

Jul. 16, 1988 [DE] Fed. Rep. of Germany ....... 3824160

[51] Int. Cl.[5] ............................................. F02K 11/00
[52] U.S. Cl. ................................................ 60/203.1
[58] Field of Search ............................. 60/200.1, 203.1

[56] References Cited

U.S. PATENT DOCUMENTS 4,305,247 12/1981 Ellion et al. ...................... 60/200.1
4,470,258 9/1984 Steenborg .
4,656,828 4/1987 Bingley et al. ..................... 60/203.1

Primary Examiner—Louis J. Casaregola
Attorney, Agent, or Firm—W. G. Fasse; D. H. Kane, Jr.

[57] ABSTRACT

A high performance propulsion thruster especially for the attitude and orbit control of space craft or flying bodies in space, is equipped with a heating-up device for the propulsion gas flowing to a nozzle. The heating device is constructed with at least two electrical resistance heating elements for increasing the reliability and the specific impulses. The heat generated by the at least two electrical resistance heating elements is applied to a gas guide conduit which is integrated with the heating device. The gas guide conduit is made of a high temperature resistant metal or of a ceramic material. The heating device, or rather its units are constructed as modular units, preferably integrated with modular gas guide conduits. Thus, a plurality of such modular units can be combined to easily satisfy the requirements regarding dimension of such units and regarding the specific impulse of such units.

18 Claims, 4 Drawing Sheets

HIGH PERFORMANCE PROPULSION THRUSTER, ESPECIALLY FOR ATTITUDE AND ORBIT CONTROL OF A SPACE FLIGHT BODY

FIELD OF THE INVENTION

The invention relates to a high performance propulsion thruster, especially for orbit and attitude control of a space flight body. In such devices a propulsion gas passes through a heat-up device before it is exhausted through a nozzle.

BACKGROUND INFORMATION

Such propulsion thruster uses as a fuel primarily hydrazine ($N_2H_4$). The hydrazine is decomposed, thereby producing a substantial amount of heat, whereby the decomposition of the propulsion gas produces the required thrust when exhausting out of a nozzle for orbit and attitude control. However, it has been a problem to increase the possible thrust produced by the propulsion gas by further heating such propulsion gas.

German Patent Publication (DE-OS) 3,128,735 discloses a propulsion thruster of the type mentioned above. The known propulsion thruster comprises a heating device arranged upstream of the nozzle as viewed in the gas flow direction. The heating device comprises a metallic pipe which is heated by the direct passage of an electrical current through the pipe. Such a pipe is constructed in the form of a long spiral or helix, whereby the propulsion gas first flows in contact with the outer surface of the heating-up device and then close to the nozzle enters into the heating pipe. The propulsion gases thus heated to a higher heat content finally enter into a central leading tube to the propulsion nozzle.

The just mentioned conventional gas heating pipe has the disadvantage that the pipe itself which functions as a heat exchanger is the electrical conductor. Moreover, the arrangement is limited to a single heating pipe since it is not feasible to split the gas stream for flowing through several heating pipes. Thus, when the heating pipe fails, a substantial reduction in the power output is unavoidable.

Another disadvantage of the prior art heating pipe is seen in that the pipe due to its helical shape, and due to the maximally occurring temperatures of up to 2300° C. can be made only of rhenium. Further, the conventional heating pipe is not easily modified for adaptation to special situations or requirements. Particularly, the known system is not capable of a further substantial thrust increase by way of further heating the propulsion gases while simultaneously keeping the structure as compact as possible.

OBJECTS OF THE INVENTION

In view of the above it is the aim of the invention to achieve the following objects singly or in combination:

to provide a high performance propulsion thruster of the type mentioned above which can further heat the propulsion gases without any increase in thruster size, thereby achieving a reliable increase in the specific impulses;

to efficiently increase the specific impulse of such high performance thrusters without increasing their dimension;

to avoid losing the additional heat-up entirely if one heating device fails;

to integrate at least two gas heating devices into the gas feeding conduit just upstream of the propulsion nozzle;

to assure a uniform heat transfer over an optimally large heat transfer surface between the gas and the heaters; and to construct the components of the system as modular elements so that these elements are easily assembled in accordance with the space and power output requirements of individual situations.

SUMMARY OF THE INVENTION

A high performance propulsion thruster according to the invention is characterized in that the heat-up device for the propulsion gas comprises at least two electrical resistor heating elements for transferring heat to the propulsion gas through a gas guiding duct integrated into the heat-up device. Such integration assures an efficient and certain function of the heat-up for the increase of the specific impulse because if one electrical heating element should fail, there is still the other electric heating element to keep the propulsion thruster operating. Even if both electric heating elements should fail, it is still possible for the propulsion thruster to keep operating satisfactorily due to the indirect heat-up according to the invention. The present propulsion thruster can have small dimensions and hence be of a compact construction because the present heating device has small dimensions, whereby simultaneous good vibration characteristics or rather vibration stiffness is achieved and the insulation of the propulsion thrusters from the other structure of the space flight body is assured in an effective manner. The construction of the present system is simple. Due to the integration of the gas guide conduit into the heating device, efficient heat transfer characteristics are assured, especially with regard to the heat exchange surface. The gas guide conduit is constructed to have an efficient heat conducting effect. The just mentioned advantageous features provide in combination a noticeable specific impulse increase of the propulsion plant as compared to conventional propulsion thrusters of this type.

The present gas guide conduit is preferably and advantageously made of a material that is resistant against breakage and also heat resistant, such as carbon or a metal selected from the group of rhenium, tungsten, molybdenum, or the like, and alloys thereof. Where an oxidizing environment is to be taken into account, material, such as rhodium, iridium, ruthenium or platinum or alloys thereof, may be used. Preferably, the gas guide conduit is made of boron nitride which, for example, as compared to rhenium has the advantage of being more easily produced and being capable of resisting even higher temperatures.

The gas guide conduit constructed according to a preferred embodiment of the invention is formed as a flat spiral which is arranged between at least two flat electrical heating elements providing an optimal surface contact with the gas guide conduit. As a result, an advantageous large surface area heat transfer is assured which takes place uniformly over the entire heat transfer surface area.

According to an advantageous alternate embodiment of the invention the gas guide conduit can be constructed as a long spiral or helix arranged between two heating elements constructed as cylinder shell type configurations. Here again, a large heat transfer surface is provided between the heating elements and the gas guide conduit and the heat transfer is uniform throughout the heat transfer contact surface.

The heating device according to the invention is preferably constructed a modular elements which are easily assembled in accordance with specific requirements, whereby, preferably, at least two heating modular elements are used in combination and cooperating with at least one gas guide modular unit arranged between the two heating modular units. These features permit an advantageous adaptation of the present system to the available space and to the power requirements.

It is also possible to arrange two gas guide modular units between two heating modular elements. In that case it may be advantageous, for example, from a manufacturing point of view, if at least one of the two modular gas guide units comprises a flat or longitudinal spiral channel. This channel is advantageously closed by its complementary gas guide modular unit. The closure of the channel may be accomplished by a flat complementary unit forming a type of cover or by a complementary unit which also has gas guide channels therein supplementing the respective channels in the other modular unit.

According to another embodiment of the invention the heat-up device comprises, instead of single flight heating elements and gas guide modular elements, at least two combined heating element and gas guide modules fitting to each other, wherein the gas guide channels are provided at least in one half of the combined unit. The electrical resistance heating elements in this embodiment may be provided either individually for each modular unit, or in common for both modular units.

A modification of the heating-up device equipped with modular heating elements is so constructed that each heating element comprises a ceramic base on which a carbon heating track is applied by vapor deposition. The so produced carbon heating track is preferably sealed by a pyrolytic coating of boron nitride performed by a CVD process (CVD=chemical vapor deposition).

In another embodiment of the heating-up device comprising combined heating elements and gas guide modules, the heating elements are made of resistance heating wires which are spaced from neighboring gas guides at a uniform spacing and which are also integrated into a modular unit.

The power supply to the heating-up device is advantageously controlled in response to the temperature, especially the gas temperature, and/or in response to the gas quantity flowing through the device. In this case, one heater element must be switched off. As a result, a separate or additional electronic closed loop control is not necessary.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
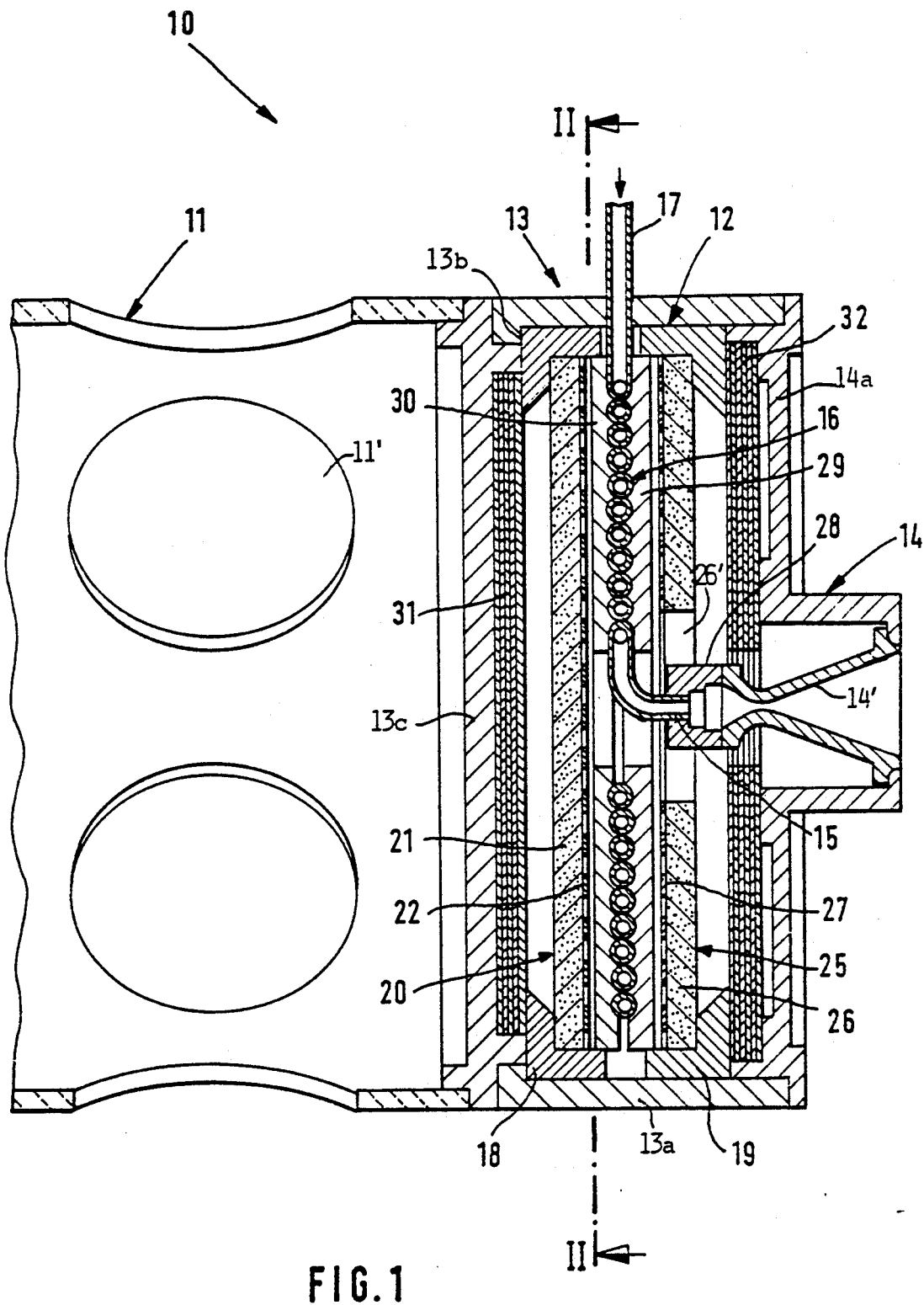
FIG. 1 is a sectional view through the nozzle end of a high performance propulsion thruster according to the invention.

In FIG. 1, the section line II—II runs between the gas guide conduit 16 and one of the heating units 20 through the rear portion of the high performance propulsion thruster 10. The propulsion housing comprises a heat shield 11 with vents 11'. The heating-up device 12 is attached to the heat shield 11 by conventional means. The heating-up device 12 is arranged in a housing section 13 of the propulsion thruster 10. A nozzle housing 14 is secured to the housing section 13. The inlet to the nozzle 14' mounted in the nozzle housing 14 is connected through a connector element 28 to the outlet 15 of the gas guide conduit 16. Propulsion gas enters through an inlet 17 into the conduit 16 and exits through an outlet 15 leading into the connector 28 and from there into the nozzle 14'. The inlet 17 passes through the side wall of the housing section 13.

Figure 2:
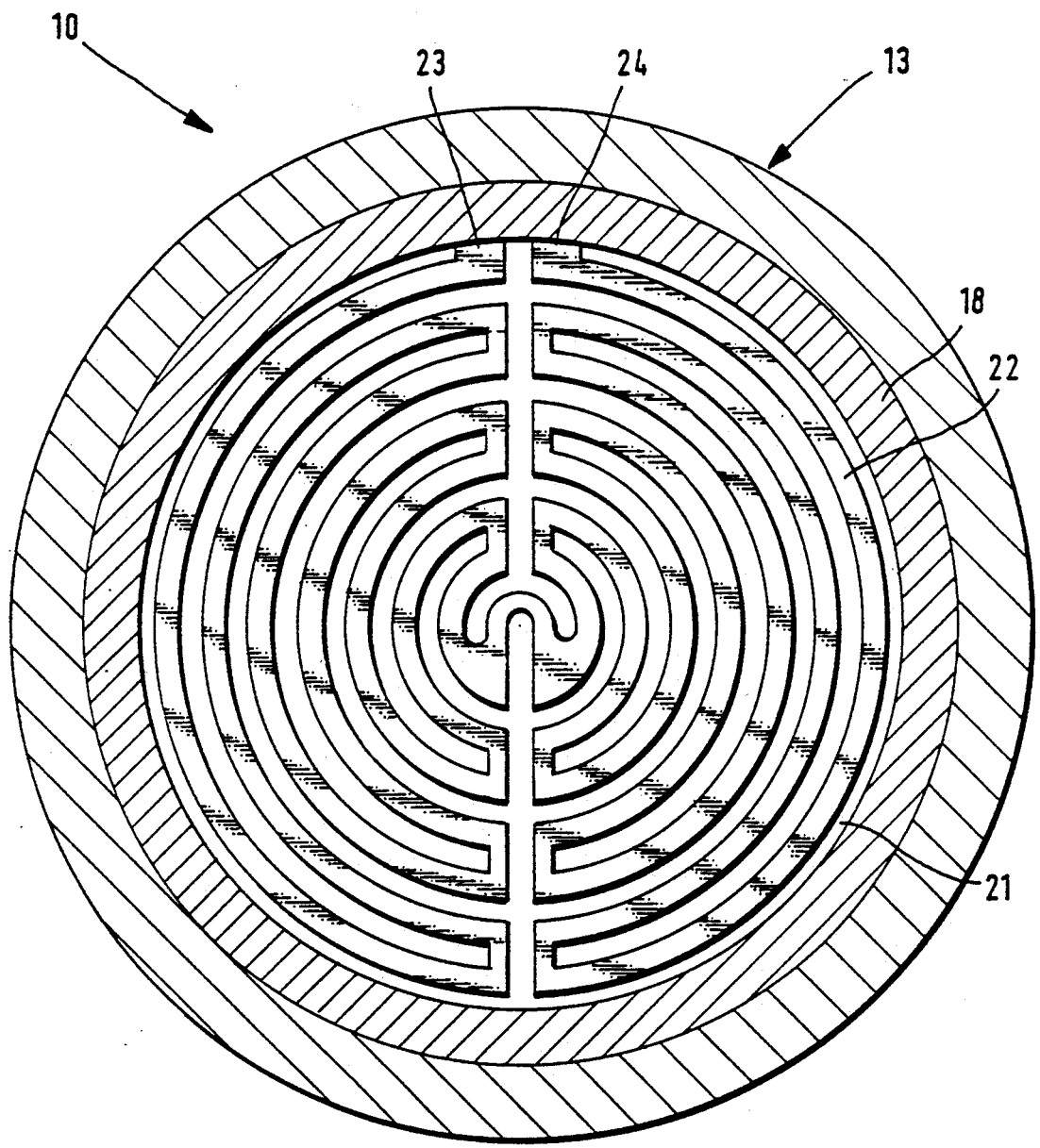
FIG. 2 is a view along section line II—II in FIG. 1.

The heating-up device 12 comprises two mounting rings 18 and 19 made of sectional stock having an angled profile. These rings 18 and 19 are mounted in a cylindrical housing portion 13a having a shoulder 13b against which the ring 18 rests. A further mounting member 13c also having a sectional profile is inserted between the housing portion 13a and the heat shield 11. These components are preferably made of pyrolytic boron nitride. The mounting ring 18 supports a disk-shaped first electrical heating element 20 comprising a ceramic plate 21 on which a resistance heating track 22 of carbon has been applied by vapor deposition. The carbon tracks 22 have, for example, a semicircular configuration and are distributed concentrically as best seen in FIG. 2. The semicircular conductor tracks are connected to each other to provide a series connection between power supply terminals 23 and 24 connected, for example, to a battery not shown. The power supply from the battery to the terminals 23 and 24 is preferably controlled in a closed loop manner by a respective switch in response to each temperature and/or gas flow quantity measurements. For example, the terminal 23 is connected to the negative terminal of the battery while the terminal 24 is connected to the positive terminal of the battery when the heating device is switched on.

Referring again to FIG. 1, the mounting ring 19 carries a second heating element 25 having substantially the same construction as the heating element 20. Thus, the heating element 25 also comprises a ceramic disk 26 provided with an opening 26' for the mounting of the connector 28 which connects the gas conduit outlet 15 to the inlet of the nozzle 14'. The annular disk 26 is provided with a resistance heating track 27 also arranged in circular or semicircular loops and made of carbon applied by vapor deposition and sealed in by a pyrolytic layer or coating of boron nitride.

Two intermediate plates 29 and 30 made of pyrolytic boron nitride are sandwiched between the electric heating elements 20 and 25. Each intermediate plate 29, 30 is provided with a flat spiral system of channels in which the gas guide conduit 16 is mounted as shown. Thus, between the inlet 17 and the outlet 15 the individual ducts of the conduit 16 are arranged in spiral form made of a pipe or tubular member. The channels in the two plates 29 and 30 need not be deep enough to each take up one half of the spiral gas conduit. As shown in FIG. 1, a small spacing is left between the two plates 29 and 30 after the gas conduit spiral 16 has been inserted between the plates 29 and 30. Two heat insulating wall members 31 and 32 are inserted between the mounting rings 18 and 19 on the one hand, and housing wall members 13c and 14a on the other hand. Each of the heat insulating wall members 31 and 32 is preferably made of a plurality of thin foils of tantalum arranged in a stack. However, other foils of suitable heat insulating qualities may also be used. The wall member 31 is held in a recess of the housing member 13 by the mounting ring 18. The wall member 32 is held in a similar recess of the housing member 14a by the mounting ring 19. The housing wall member 14a also carries centrally thereof the nozzle housing 14 in which the nozzle 14' is mounted.

The heating device with its heating elements 20 and 25 is constructed as a modular unit. Similarly, the gas guide conduit with its intermediate plates 29 and 30 is constructed as a modular unit. The heating elements 20 and 25 are each a module and so are the intermediate plates 29 and 30.

Figure 3:
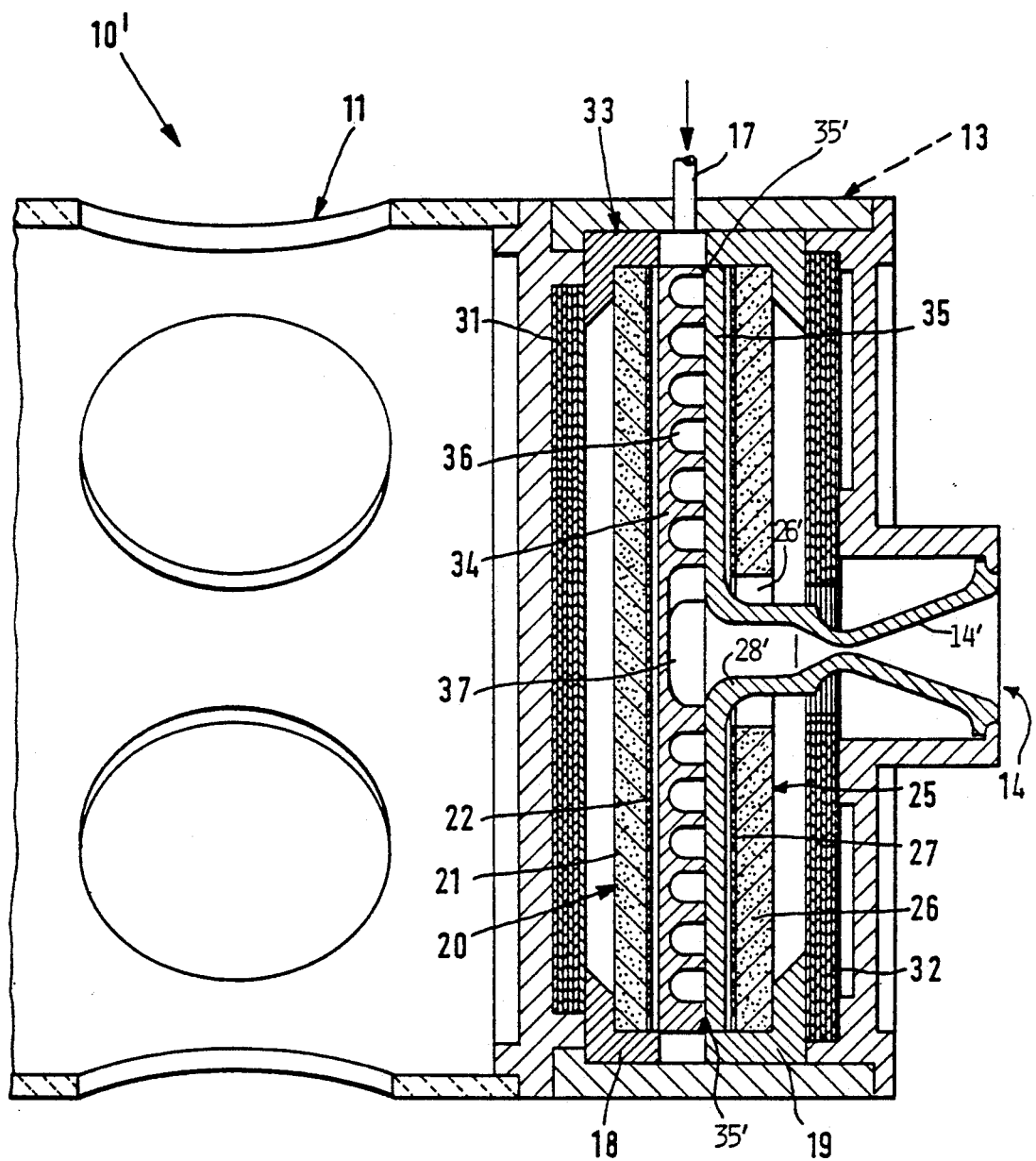
FIG. 3 is a sectional view similar to that of FIG. 1, but showing another embodiment of a high performance propulsion thruster according to the invention.

In the embodiment illustrated in FIG. 3, showing a modified high performance propulsion thruster 10', the components performing the same function are provided with the same reference numbers so that in the following only the differences between the embodiments of FIGS. 1 and 3 will be described. In FIG. 3 the intermediate plates 29 and 30 of pyrolytic boron nitride have been replaced by a gas guide plate 34 arranged between the heating elements 20 and 25. The gas guide plate 34 is closed by a cover 35 forming simultaneously the nozzle 14' in the nozzle housing 14, whereby a connecting extension 28' is arranged between the plate 35 proper and the nozzle 14'. The heating unit 33 with its heating elements 20 and 25 is substantially of the same construction as in FIG. 1. However, the gas guide plate 34 with its nozzle cover plate 35 differs from the gas guide conduit 16 of FIG. 1. The gas guide plate 34 and its cover plate 35 are made of a weldable or solderable ceramic material and are welded or soldered to each other at 35'. Thus, a flat spiral shaped gas channel 36 in the gas guide plate 34 is closed in a gas-tight manner by the cover 35. Gas enters again at the inlet 17 and passes directly through the connecting section 28' into the nozzle 14'. The gas travels along the spiral paths into a nozzle antechamber 37 whence it can pass through the connecting portion 28'. Thus, in the embodiment of FIG. 3, the gas conduit pipes are avoided which also avoids the manufacturing of the spiral shaped pipe. The channel grooves 36 in the gas guide plate 34 may be produced by any conventional machining or molding operation and the so produced ceramic plate forming the gas guide conduit 34 has a substantially improved temperature stability so that the welding 35' can be performed without any problems on the ceramic material of which the plate 34 and the cover 35 are made. The channel facing surface of the cover 35 is a flat surface so that it merely closes the channels without forming part of the channels.

Figure 4:
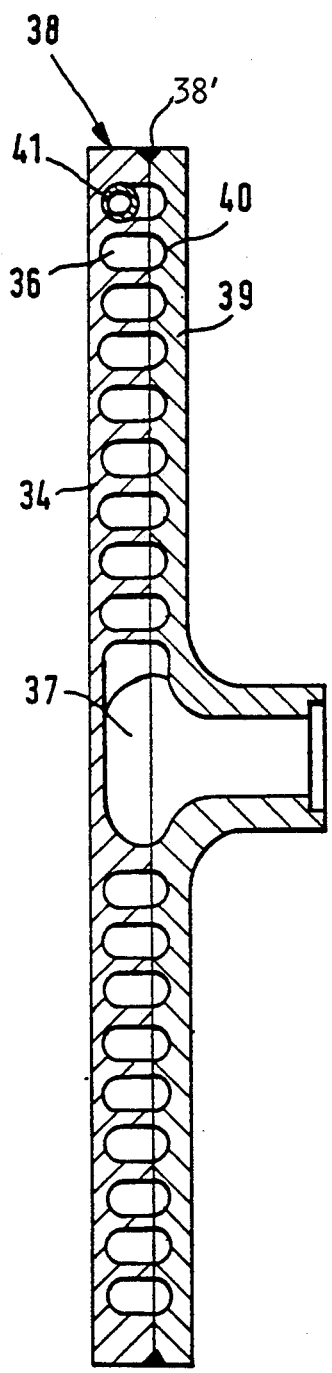
FIG. 4 illustrates a sectional view through a gas guide modular unit according to the invention.

FIG. 4 illustrates a modification of the channel cover plate shown in FIG. 3. The cover plate 39 of FIG. 4 comprises channel sections 40 which match with the channels 36 in the plate 34. Thus, the flow volume and the cross-sectional flow area is increased in FIG. 4 as compared to FIG. 3. The two plates 34 and 39 are again welded to each other at 38' to form the modular gas conduit unit 38. The channel sections 40 in the plate 39 complement the channel sections 36 in the plate 34, thus providing the just mentioned larger cross-sectional flow area for the gas passing from an inlet pipe 41 into the antechamber 37 and from there into the nozzle proper. The welding seam 38' may be accomplished by a so-called electron-beam welding. The inlet pipe 41 may be soldered into the first turn of the conduit channels 36 forming the flat gas guide conduit.

It is absolutely necessary that the welding seam 38' is completely gas-tight. However, it is relatively simple to provide a gas-tight joining between the cover 39 and the channel plate 34 by means of a diffusion welding or by high temperature soldering or brazing with respective solders. The cover 39 and the plate 34 can be made of tungsten, rhenium, molybdenum or platinum, iridium, rhodium, ruthenium and their alloys.

The gas guide conduit of FIG. 3 already provides an improved surface area for the heat transfer as compared to FIG. 1. A further surface are increase is provided by the embodiment of FIG. 4 due to the enlargement of the channel sections 40, whereby the heat transfer from the electrical heating elements 25 onto the gas flowing in the channels 36 and 40 is further improved.

Figure 5:
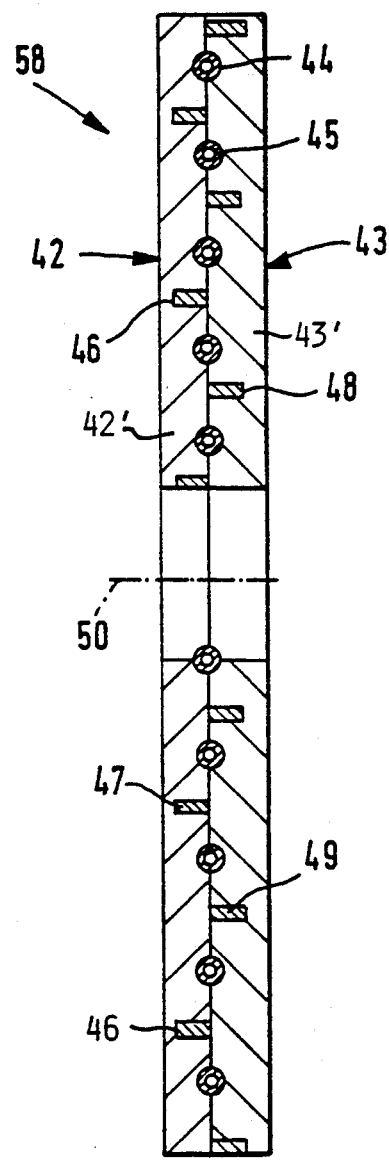
FIG. 5 is a sectional view illustrating a further embodiment of a heat-up device for a high performance propulsion thruster.

FIG. 5 illustrates another modified embodiment of a heating device 58 which can be used instead of the heating devices described above. The device 58 comprises two heating and gas guide modular units 42 and 43 each including a respective plate 42' and 43'. The plates 42' and 43' can only be made of ceramics such as boron-nitride, hafnium-carbide, thorium-carbide, silicon-carbide, aluminum oxide. The plate 42' is provided with flat spirally arranged grooves 46 in which spirally wound heating wires 47 are received. Similarly, the plate 43 is provided with spiral grooves 48 in which spirally wound heating wires 49 are received. Additionally, the plates are provided with spirally arranged channels in which a gas conduit pipe 45 is arranged. The pipe conduit 45 is also spirally wound. The grooves 46 and 48 have an approximately rectangular cross-section. However, the grooves 46 in the plate 42' are displaced by 180° relative to the grooves 48 in the plate 43'. This 180° displacement is measured around the central axis 15 as the modular unit is rotated about this axis. The grooves 46 and 48 have the same spacing to the neighboring gas channels 44 and thus, the pipes 45. The spacings between neighboring grooves 46 in the same plate 42' and the spacings between the grooves 48 in the plate 43' are the same. However, the spacings are twice as large as the spacings between the channels 44 in which the ga guide pipes 45 are received.

The cross-sectional configurations of the grooves 46 and 48 do not have to be rectangular. The cross-sections may be oval, round, or they may have any other suitable cross-sectional configuration. The heating wires 47 and 49 are made of rhenium, tungsten, molybdenum, iridium, rhodium, tantalum, or alloys of these materials. These heating wires could also be made of carbon tapes and/or carbon webbings. The arrangement as shown in FIG. 5 has a good redundance for the heating elements so that space flight requirements are satisfied.

Figure 6:
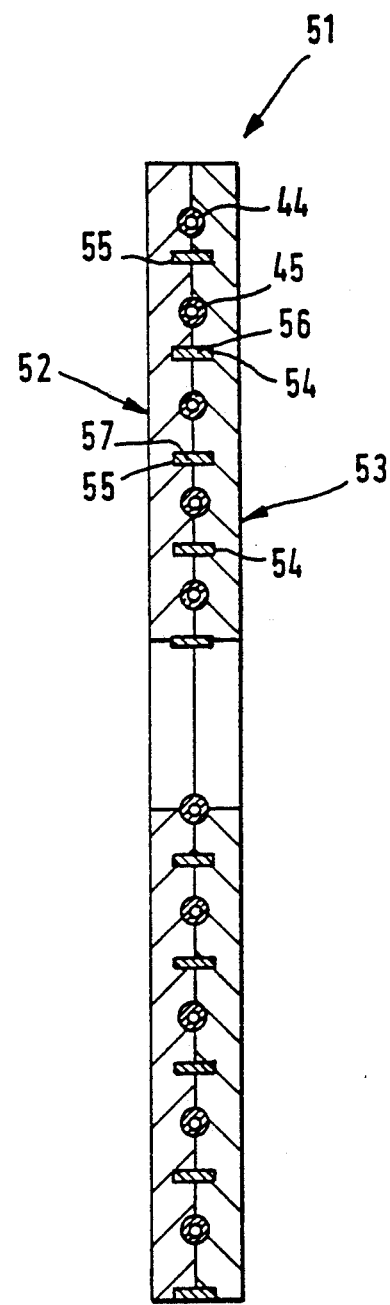
FIG. 6 is a further embodiment of a heat-up device according to the invention.

FIG. 6 shows a heating-up device 51 similar to the device 58 of FIG. 5. However, the grooves 54 and 55 in the plates 53 and 52 respectively are mirror-symmetrical images of each other. Both sets of grooves have a spiral configuration, whereby the spacing between the groove 54 to its neighboring groove 55 is substantially the same as the spacing to the next neighboring groove. Heating wires 56 are inserted in the grooves 54. Heating wires 57 are inserted in the grooves 55. Thus, here again, two separate heating units or heating elements are provided. Gas guide ducts 45 in the form of pipes are again inserted into respective groove 44 as in the embodiment of FIG. 5.

Both embodiments shown in FIGS. 5 and 6 disclose heating units 58 and 51 constructed in accordance with the modular concept. Thus, two or more so constructed units may be assembled to provide, for example, for a larger redundance for the electric heating elements and to provide a larger surface area for the gas conduits, thereby increasing the heat exchange, or rather the heat transfer surface areas. The use of a plurality of such modular units makes it easy to increase the gas throughput rate and to thus increase the thrust of the propulsion thruster.

The heating elements shown in the drawings are individually connectable to the respective power sources, whereby switching on and switching off is accomplished with simple switching means not shown without requiring separate closed loop electronic control means.

The switching is simply accomplished by operating the respective switches in response to temperature and gas quantities. For example, for large gas quantities all heating elements are switched on, while for smaller gas quantities the heating elements may be switched off in stages or steps while maintaining the output temperature of the propulsion gas.

Although the invention has been described with reference to specific example embodiments it will be appreciated that it is intended to cover all modifications and equivalents within the scope of the appended claims.

What I claim is:

1. A high performance propulsion thruster, comprising housing means, propulsion nozzle means operatively mounted in said housing means, propulsion gas heating means mounted in said housing means, gas guide conduit means constructed as a substantially flat spiral mounted in said housing means for supplying propulsion gas to said nozzle means and in such a position that said gas guide conduit means are integrated into said heating means for heating said propulsion gas by said heating means, said propulsion gas heating means comprising at least two electrical resistance heating elements constructed as surface area heaters for transferring heat to said propulsion gas as it flows through said gas guide conduit means to said propulsion nozzle means, and wherein said substantially flat spiral of said gas guide conduit means is arranged between said surface area heaters.

2. The thruster of claim 1, wherein said gas guide conduit means are made of a high temperature resistant metal.

3. The thruster of claim 1, wherein said gas guide conduit means are made of a high temperature resistant ceramic material which is weldable and/or solderable.

4. The thruster of claim 1, wherein said surface area heaters are flat in a plane parallel to said substantially flat spiral.

5. The thruster of claim 1, wherein said electrical resistance heating elements (47) are also constructed as a spiral having axially oriented spiral heater turns, and wherein said gas guide conduit spiral has conduit spiral turns arranged so that each conduit spiral turn is located between at least two of said spiral heater turns.

6. The thruster of claim 1, wherein said gas heating means with their electrical resistance heating elements are constructed as modular units.

7. The thruster of claim 1, wherein said gas guide conduit means is constructed as a modular unit.

8. The thruster of claim 1, wherein said gas heating means with their electrical resistance heating elements are constructed as modular heating units, wherein said gas guide conduit means is constructed as a modular unit, and wherein at least one gas guide modular unit is arranged between at least two modular heating units.

9. The thruster of claim 8, wherein at least one unit of two matching gas guide modular units comprises a gas guide channel having a flat spiral or a helical configuration.

10. The thruster of claim 1, wherein said gas guide conduit means comprise a modular unit having a first flat section with gas guide channels therein and a second flat section forming a cover member.

11. The thruster of claim 10, wherein said second flat section also has gas guide channels (40) therein which are arranged and constructed to be complementary to the gas guide channels in said first flat section.

12. The thruster of claim 10, wherein said cover member has a nozzle connecting portion (28').

13. The thruster of claim 1, wherein said gas guide means and said propulsion gas heating means are constructed as modular units comprising two modular plates in common, said plates comprising first and second grooves for first and second electrical resistance heating elements, and gas guide channel means in at least one of said two modular plates for guiding said propulsion gas along a heat transfer path for heating said propulsion gas.

14. The thruster of claim 13, wherein one of said two electrical resistance heating elements is arranged in each of said two modular plates.

15. The thruster of claim 13, wherein said first and second grooves are arranged in one of said modular plates so that both electrical resistance heating elements are arranged in one plate.

16. The thruster of claim 1, wherein each of said two electrical resistance heating elements comprises a ceramic base plate, and a carbon electrical resistance heating track on said ceramic base plate.

17. The thruster of claim 16, further comprising a sealing coating of pyrolytic boron nitride on said heating track.

18. The thruster of claim 16, wherein said electrical resistance heating elements comprise resistance heating wires uniformly spaced from neighboring gas guide conduit means, said resistance heating wires forming with said gas guide conduit means an integral modular structure.

* * * * *